(12) United States Patent
Eick et al.

(10) Patent No.: US 9,229,120 B2
(45) Date of Patent: Jan. 5, 2016

(54) DISCRETE ELECTRIC SEISMIC SOURCE UNIT

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 431 days.

(21) Appl. No.: 13/874,062

(22) Filed: Apr. 30, 2013

(65) Prior Publication Data

US 2013/0286791 A1      Oct. 31, 2013

Related U.S. Application Data

(60) Provisional application No. 61/640,309, filed on Apr. 30, 2012.

(51) Int. Cl.
*G01V 1/155* (2006.01)
*G01V 1/09* (2006.01)

(52) U.S. Cl.
CPC .................................. *G01V 1/09* (2013.01)

(58) Field of Classification Search
CPC ....... G01V 1/09; G01V 1/143; G01V 1/1047; G01V 1/147; G01V 1/145; G01V 1/155
USPC .......................................... 181/111, 114, 121
See application file for complete search history.

(56) References Cited

U.S. PATENT DOCUMENTS

| | | | | |
|---|---|---|---|---|
| 2,675,882 A | * | 4/1954 | Bazzoni et al. | 181/111 |
| 3,777,843 A | * | 12/1973 | Fair et al. | 181/114 |
| 4,114,722 A | * | 9/1978 | Weber et al. | 181/114 |
| 4,133,409 A | * | 1/1979 | Mifsud et al. | 181/114 |
| 4,372,420 A | * | 2/1983 | White | 181/120 |
| 4,458,777 A | * | 7/1984 | Weber et al. | 181/121 |
| 4,651,044 A | * | 3/1987 | Kompanek | 310/323.17 |
| 4,715,470 A | | 12/1987 | Paulsson | |
| 4,853,906 A | * | 8/1989 | Cole | 367/189 |
| 5,614,670 A | * | 3/1997 | Nazarian et al. | 73/146 |
| 5,901,113 A | | 5/1999 | Masak et al. | |
| 7,139,219 B2 | | 11/2006 | Kolle et al. | |
| 7,562,740 B2 | | 7/2009 | Olunadeja | |

(Continued)

FOREIGN PATENT DOCUMENTS

WO       2009085732       7/2009

*Primary Examiner* — Ari M Diacou
(74) *Attorney, Agent, or Firm* — ConocoPhillips Company

(57) ABSTRACT

The invention is an electric sweep type seismic vibrator source of the type used in seismic prospecting for hydrocarbons. The source uses an engine and generator combination to create electric power for all systems on the source such as driving a frame of linear electric motors that direct a rod or piston to contact the ground in a recurring fashion along with driving the source from location to location through a survey area. The seismic source includes systems for driving the acoustic energy systems using electric energy concurrently from both the generator and an electric energy accumulator such as a capacitor or battery, systems for adjusting the weight on the acoustic energy delivery system by raising and lowering wheels individually and an active energy isolation to isolate the chocks and impulses of the acoustic energy delivery system from the remainder of the seismic source.

23 Claims, 4 Drawing Sheets

(56) References Cited

U.S. PATENT DOCUMENTS

| | | | |
|---|---|---|---|
| 7,657,350 B2 * | 2/2010 | Moran | 701/22 |
| 7,841,444 B2 * | 11/2010 | Cannell et al. | 181/121 |
| 8,256,565 B2 * | 9/2012 | Pabon et al. | 181/104 |
| 2003/0168277 A1 * | 9/2003 | Hopperstad et al. | 181/111 |
| 2010/0232260 A1 * | 9/2010 | Zowarka et al. | 367/189 |
| 2011/0209940 A1 * | 9/2011 | Daraio | 181/139 |
| 2012/0037444 A1 * | 2/2012 | Eick et al. | 181/114 |
| 2013/0155817 A1 * | 6/2013 | Kim | 367/189 |

* cited by examiner

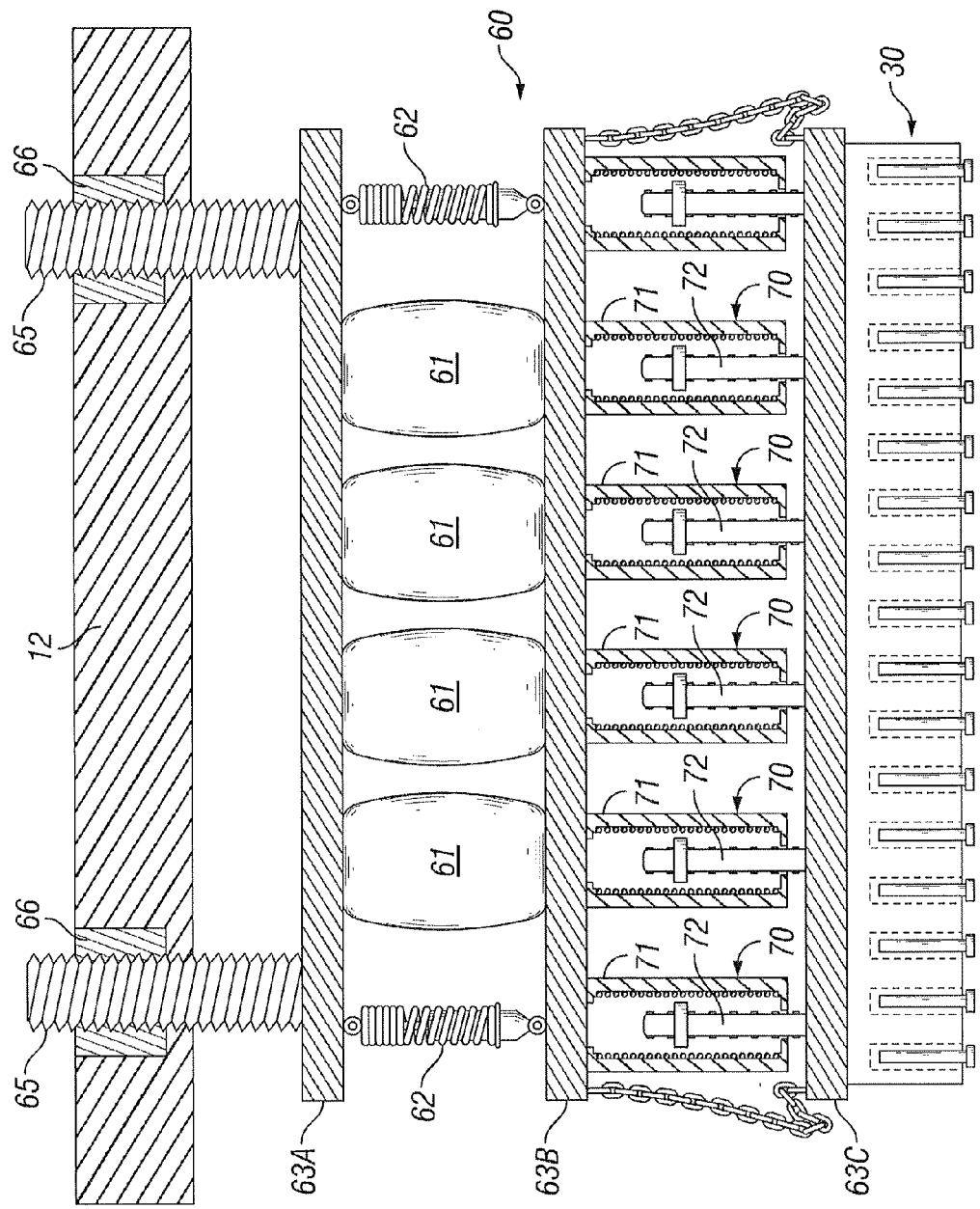

DISCRETE ELECTRIC SEISMIC SOURCE UNIT

CROSS-REFERENCE TO RELATED APPLICATIONS

This application is a non-provisional application which claims benefit under 35 USC §119(e) to U.S. Provisional Application Ser. No. 61/640,309 filed Apr. 30, 2012, entitled "DISCRETE ELECTRIC SEISMIC SOURCE UNIT," which is incorporated herein in its entirety.

STATEMENT REGARDING FEDERALLY SPONSORED RESEARCH

None.

FIELD OF THE INVENTION

This invention relates to vibratory seismic sources and particularly to seismic sources that are held to the ground to deliver vibratory impulses into the earth for seismic prospecting of hydrocarbons and other subsurface resources.

BACKGROUND OF THE INVENTION

In the process of acquiring seismic data, seismic energy is delivered into the earth. Over the years, the preferred attributes of the seismic energy delivered into the earth have been honed to include a broad spectrum of wavelengths and sufficient power across the spectrum to be recorded at the surface. In general, a suitable land source must be able to deliver seismic energy waves in a spectrum of wavelengths from about 8 Hz up to 60-80 Hz. The source must have sufficient power across the spectrum so that the seismic waves have measurable amplitude at the surface after transiting deep into the earth, reflecting from or refracting through layers in the earth and transiting back to the surface. A last major characteristic of a desirable seismic source is that the energy from the source is distinguishable in the data record from seismic energy from other sources whether from background sources or other seismic prospecting.

Explosive charges have long been used as seismic sources although the intense release of energy is typically not permitted except in remote locations. Explosive sources, however, provide a wide array of wavelengths with considerable power across the wavelengths.

Hydraulic reciprocating seismic vibrators or vibes have been in use for many years using a baseplate connected to hydraulic rams that cause a reaction mass to reciprocate up and down to shake the ground through the baseplate. The hydraulic rams are operated to move the reaction mass through a sweep of the desired frequencies. However, the hydraulic systems are limited in their ability to provide sufficient power at high frequencies due to fluid limitations of hydraulic flow in and out of the hydraulic cylinders. At very high hydraulic velocities, the hydraulic fluid is subject to cavitation effects when reversing directions that limits the amplitude of the movement of the reaction mass and thus the energy input in to the earth. At low frequencies it is difficult for the hydraulic vibe to have enough travel to generate a low frequency wave into the ground. For example, consider how one would generate a one Hz wave with a hydraulic vibe. A very long throw of the reaction mass is needed to generate that wavelet because the mass has to be moving down and up the full one second.

BRIEF SUMMARY OF THE DISCLOSURE

The invention more particularly relates to a vibratory seismic source for delivering acoustic energy into the ground for seismic prospecting that includes a chassis and a generator for creating electric power mounted to the chassis. A plurality of linear motors are arranged in a grid wherein each linear motor includes a rod that is arranged to move generally vertically to contact the ground with a lower end of the rod. A control system is provided for directing electricity from the generator and concurrently from the electric power accumulator to electrically power movement and for controlling movement of the rods such that the rods vibrate the ground and deliver acoustic energy into the ground. A plurality of wheels are provided on which to convey the source from location to location and at least one electrically powered motor is provided to raise and lower the wheels for transiting around the survey area and adjust for delivering acoustic energy into the ground. An active isolation system is arranged between the grid of linear motors and the chassis for absorbing at least a portion of the acoustic energy that is created by the linear motors and preventing the acoustic energy from conveying excessive vibration to the chassis and other portions of the seismic source.

The invention also relates to a process for delivering acoustic energy into the earth for seismic prospecting wherein electric power is created on a mobile seismic source. Excess created electric power is periodically storied in an electric power accumulator on the mobile seismic source. Electric power on the mobile seismic is used to raise and lower wheels on the mobile seismic source and thereby raise and lower the seismic source with respect to the ground. Electric power is also used to move each rod of a plurality of linear electric motors generally vertically to contact the ground with the lower end of each rod at the selected location. The movement of the rods is controlled such that the rods vibrate the ground and deliver acoustic energy into the earth. Electric power is utilized directly from both the generator and the accumulator concurrently to power the linear electric motors when delivering acoustic energy into the earth. The acoustic energy that might propagate back through the mobile seismic source is actively isolated with active isolation elements arranged between the plurality of linear electric motors and the remainder of the mobile seismic source.

"Generally vertical" or "generally vertically" should be interpreted as meaning "with an axis of movement sufficiently nearly vertical with respect to the ground so as effectively to impart energy to the ground." Normally, the axis of movement would be less than 20 degrees to vertical, or in another embodiment less than 10 degrees to vertical.

BRIEF DESCRIPTION OF THE DRAWINGS

A more complete understanding of the present invention and benefits thereof may be acquired by referring to the follow description taken in conjunction with the accompanying drawings in which:

FIG. 5 shows an enlarged view of the active isolation system that is between the grid of the electromechanical linear motor assemblies and the frame of the seismic source to protect the body and systems on the seismic source from the harshest vibration related to the seismic energy being delivered into the ground.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
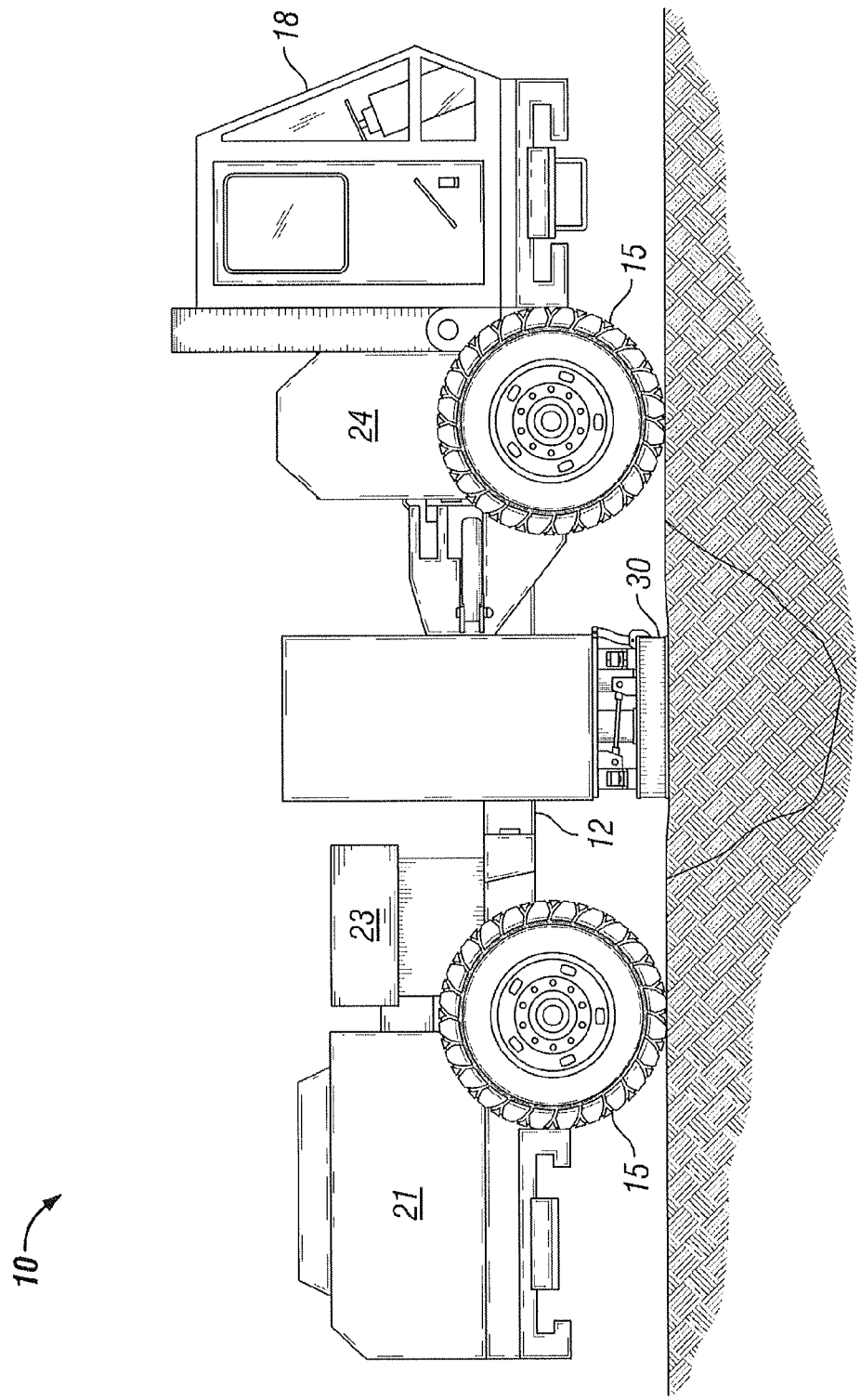
FIG. 1 is an elevation view of a discrete electric seismic source unit.

As shown in FIG. 1, an alternative vibrator seismic source 10 is shown comprising a chassis 12, four wheels 15 and a driver's cab 18. The alternative vibrator actuator source 10 uses a diesel engine 21 to turn an electric generator 23 and uses electric power to power the source 10 both for delivering acoustic energy into the ground and for moving along the ground from location to location. The source 10 utilizes electricity for all of its power needs. A large electric power accumulator 24 such as a battery or capacitor is included to store energy for high electric demand situations or when there are problems with the generator 23, but the accumulator 24 provides the power to return to a location for repair. By including a large electric power accumulator 24, the diesel engine 21 and electric generator 23 may be sized and engineered to deliver some electric power output lower than peak demand utilizing the accumulator to meet the highest needs. As such, the seismic source 10 may be smaller and obtained at lower cost and may have a lower operating cost to provide equivalent acoustic energy output.

Figure 2:
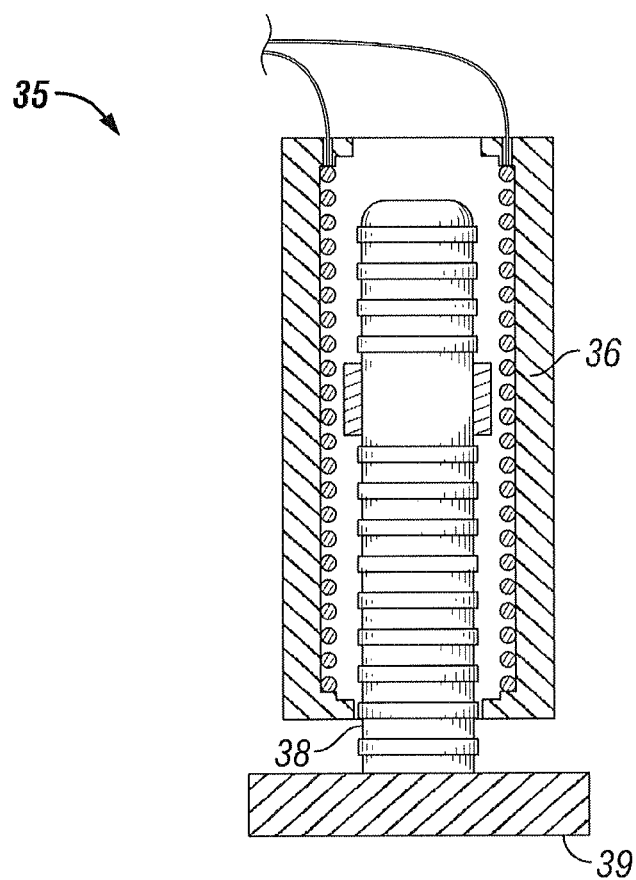
FIG. 2 is an enlarged fragmentary view of an electromechanical linear motor assembly for delivering seismic energy into the ground.
Figure 3:
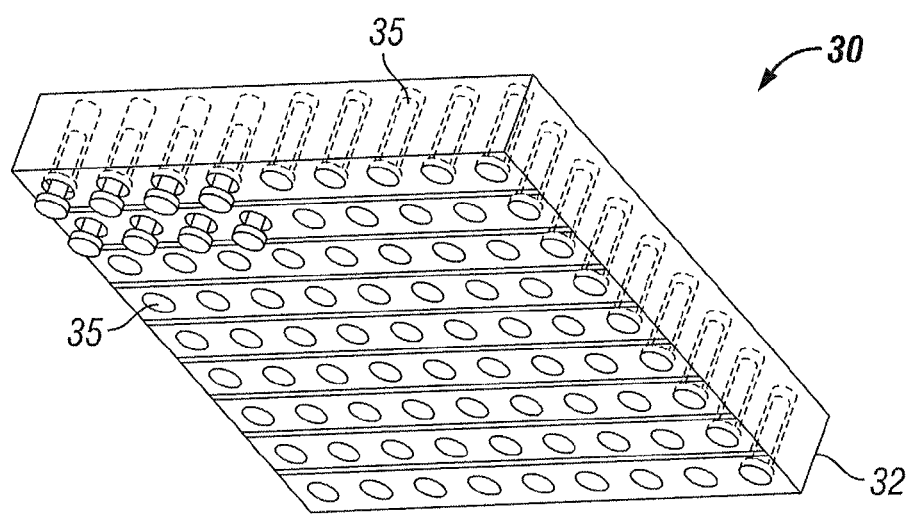
FIG. 3 is an enlarged perspective fragmentary view of a grid of electro mechanical linear motor assemblies for cooperatively delivering seismic energy into the ground.

Referring now to FIGS. 2 and 3, the acoustic energy delivery system 30 is carried under the chassis 12 and comprises a frame 32 that carries a number of linear motors 35. Linear motors are commercially available equipment and each manufacturer has variations on the design, but in principal, each linear motor 35 includes a tubular body 36 and a rod or actuation bar 38 positioned within the tubular body 36 that extends telescopically from the lower end of the tubular body 36. A replaceable foot 39 is attached to the bottom end of the rod 38 for contacting the ground. The frame 32 includes mounts for a grid of linear motors 35. In one envisioned embodiment, the frame 32 has approximately 112 linear motors 35 arranged in a grid of perhaps 8 by 14. Each linear motor is capable of outputting a peak acceleration force of approximately 2400 Newtons (N) or approximately 540 pounds-force while using 34 amp RMS (Arms) at 240 volts AC. The 112 linear motors would then be capable of outputting 268,800 N or 60,480 pounds-force using approximately 914 kilowatts of power. An additional advantage to the linear motor is that they come in varying sizes and force output that that can be tuned to achieve a desired acceleration and sustained velocity of motion. Also the electronic control for the linear motor is will understood because of the wide use in manufacturing applications. The selection of the specific linear motors is an engineering issue at production time because they can be sourced to have a large thrust force but with short strokes as compared to those that have longer strokes with less thrust, but higher speeds.

In operation, the frame 32 is lowered into proximity to the ground G and the linear motors 35 are operated to lower the replaceable feet 39 into contact with the ground G. Once all of the replaceable feet 39 are in contact with the ground G, the linear motors 35 are activated to thrust the rods 38 toward the ground G and deflect the ground G and thereby deliver an impulse into the earth. The linear motors 35 are quickly operated to recoil the rods 38 without disengaging contact with the ground G by the replaceable feet 39. By successive thrusts and recoils, a sweep of acoustic energy is effectively delivered into the earth while the feet remain in contact with the ground G. It should be noted that the undulations and irregularities of the ground G may be accommodated avoiding decoupling across the dimension of the frame 32 because each motor is independently controlled and operated. This method may be arranged to automatically compensate for surface topographic variations along with soft and hard spots on the ground surface like rocks or logs. While it is recognized that ground typically does not deflect much, it does not take much deflection with a 60,000 pound vibrator holding the replaceable feet 39 to the ground G to deliver very useful acoustic energy. In this procedure, all of the linear motors 35 would be operated at the same time using electrical power created by the electric generator 23 although, it is preferred that the electric generator 23 is sized to provide a peak energy production that less than the needs for operating all of the linear motors 35 in a manner where energy for operating the linear motors would be supplied by a combination of energy stored in the energy accumulator 24 and the electric generator 23. The impulses would be repeated in a sequence where the impulse would occur with progressively increasing or decreasing rapidity such that a progression of frequencies of impulse forces would effectively deliver acoustic energy into the earth. As an example, the acoustic energy is generally characterizeable as some form of a progressive or variable sweep of frequencies covering a spectrum from about 1 Hz up to at least 80 Hz and preferably up to 120 Hz.

The electric linear motors 35, working in conjunction, would not suffer the limitations of the hydraulic pumping systems at high frequency. Applying and reversing electric power instantly to the linear motors 35 causes movement of the rods 38 within the tubular bodies 36, and the impulse frequency range is greatly expanded. By using electrical control circuits that are commonly available for diesel electric train locomotives and hybrid cars, the power can be applied instantly with a very high degree of control and stabilization. Linear motors are highly controllable due to the ability to control the force and velocity of the actuator bar 38 via changes in the voltage and amperage of the applied current. Also, the back-EMF generated can be accurately used as a feedback circuit to compensate for variations in the wear patterns and ground impedance variations so that the combined sweep of the whole group of linear motors is consistent and repeatable.

It should be recognized that higher frequencies than typically delivered may be achievable by the source 10. Perhaps frequencies as high as 200 Hz or higher may become useful in the field of seismic prospecting. There is no recognized reason that source 10 cannot deliver such high frequency acoustic energy into the ground G. And it is generally understood that high frequency energy provides high resolution data. Unfortunately, high frequency energy attenuates in the earth more rapidly than low frequency energy. With a large number of linear electric motors, whether 200, more than 200, possibly more than 2000 or less than 200 possibly less than 100, will be able to deliver high energy at high frequency. The size of the linear motors may be reduced or increased to adjust and adapt to ideal energy delivery system to create an optimal frequency range with high energy across the spectrum.

Figure 4:
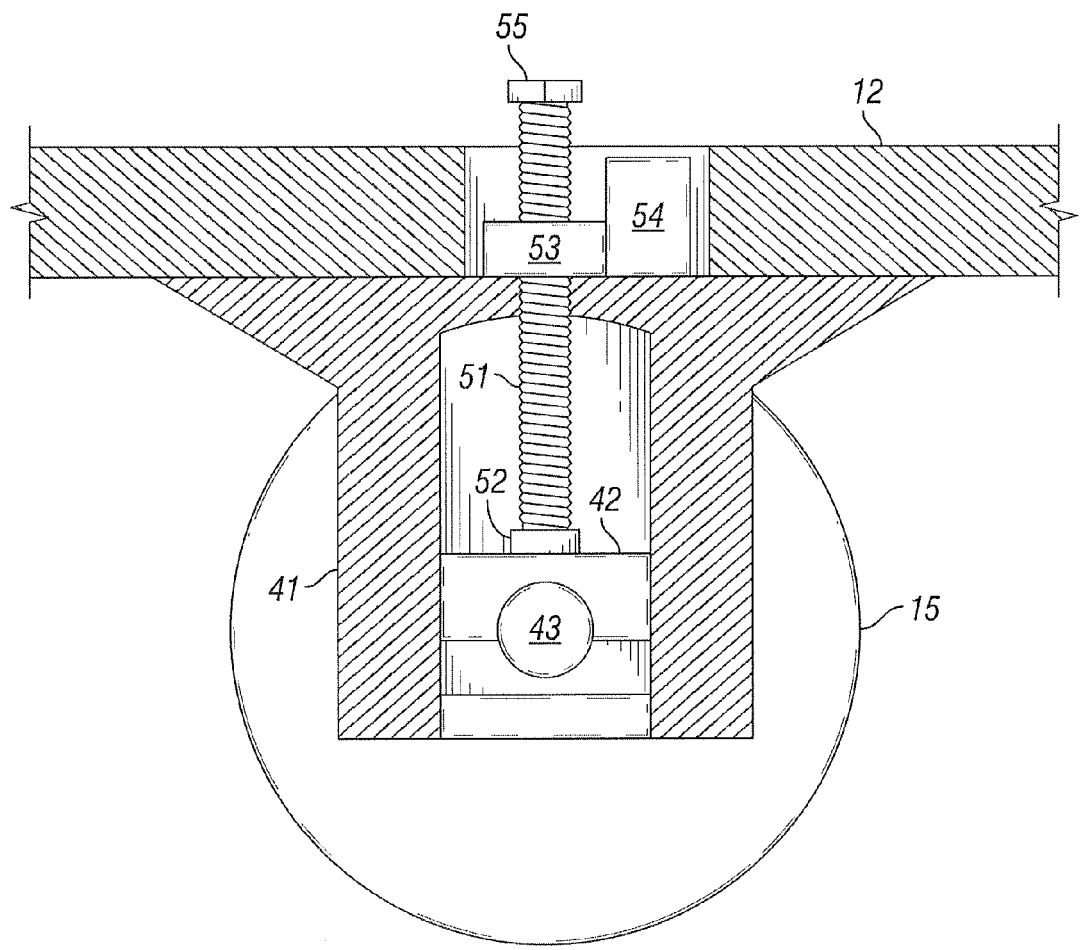
FIG. 4 shows an enlarged fragmentary view of the mechanism for driving and raising and lowering a wheel on the seismic source unit.

In one advantageous aspect of the present invention, the seismic source 10 utilizes electric motors at each wheel 15 to drive the source 10 around the survey area. Turning now to FIG. 4, the wheel are mounted to the chassis 12 of the source 10 using a grooved yoke 41 and a block 42. The yoke 41 is fixed to the chassis 12 by bolts or welding and the block is arranged to move or slide vertically within the yoke to raise and lower the wheel. Motor 43 is mounted within the block 42 which attaches directly to the wheel and causes the wheel 15 to rotate to propel the source 10. The block 42 is raised and lowered by interaction of a screw rod 51 attached to the block 42 and a screw drive 53. An electric step motor 54 is attached to the screw drive 53 to raise and lower the screw rod 51 and thereby raise and lower the block 42. A load sensor 52 is arranged at the connection of the screw rod 51 and the block 42 to sense the weight of the source on the wheel 15. A motion sensor 55 senses vertical motion at the wheel. Both sensors 52 and 55 report their information to a central control system (not shown) on the source 10. In operation, the source 10 may move onto a predetermined source location and either lower the frame 32 to put the linear motors 35 into proximity with the ground. Alternatively, the source may squat down to bring the frame 32 into proximity with the ground by raising the wheels using the screw rod 51. Secondly, the wheels 15 may be individually adjusted to provide the source 10 into a more level or horizontal orientation. Third, one aspect of providing effect acoustic energy into the earth is to have a significant portion of the weight of the source 10 be applied to the ground through the rods 38 and for the weight to be as consistent as possible through the sweep of the impulses. Load sensor 52 is arranged to measure the amount of weight being born by the respective wheel 15 and the step motor 54 may adjust the height of the wheel 15 through the screw rod 51 to maintain consistent weight on the wheel, and effectively maintain a consistent weight on the rods 38.

It is anticipated that systems utilizing electromechanical linear motors may create high intensity vibrations which will hopefully provide better results in the seismic data record. However, it is equally likely to destroy or dramatically shorten the useful life of an all electric seismic source. Such vibration may cause metal fatigue and challenge the internals of all the electrical components including the battery 24, the diesel engine 21 and really the entire source 10 above the acoustic delivery system 30. An active isolation system 60, shown in FIG. 5 is provided to isolate the harshest vibration from the chassis 12.

The active isolation system 60 connects the acoustic energy delivery system 30 to the chassis 12 and isolates the chassis 12 using heavy duty pneumatic shock absorbing bags that may be similar to pneumatic bags used in the suspensions of heavy duty trucks, along with conventional spring and hydraulic shock absorbers 62, also comparable to those used in vehicle suspensions. These pneumatic shock absorbing bags 61 and spring and hydraulic shock absorbers 62 may be arranged in any suitable manner such as shown with structural members 63A and 63B so as to be carried under the seismic source 10 while the source 10 is in transit but also arranged to support much of the weight of a very heavy seismic source 10 when delivering acoustic energy to the ground. The structural member 63A may also be attached to the chassis through a lift mechanism to raise and lower the acoustic energy delivery system 30 such as screw posts 65 and stepper motors 66 arranged with corresponding screw threaded portions to cause the active isolation system 60 and the acoustic energy delivery system 30.

The active isolation system 60 further includes active shock absorbing elements 70 which are linear motors comparable to the linear motors 35. The active shock absorbing elements 70 including a shaft 72 received telescopically into a body 71. The shaft 72 and body 71, between the two have magnets and wiring wherein an electric current in the wiring creates an electromagnetic field that causes movement or resists movement of the shaft 72 relative to the body 71. The active shock absorbing elements 70 are positioned between structural members 63B and 63C where frame 32 is attached to structural member 63C. It should be recognized that there are a myriad of acceptable arrangements of active and reactive shock absorbers for insulating the chassis 12 and the related components of the source 10 from the intense vibrations and shocks associated with delivering seismic energy into the earth.

In operation, the acoustic energy delivery system 30 is lowered into proximity to the ground using the screw posts 65 and step motors 66 until some significant portion of the weight of the seismic source 10 is applied to the ground G through the acoustic energy delivery system 30. The acoustic energy delivery system 30 is then operated to provide a sequence of impulses where the rods 38 push rapidly toward the ground to deflect the ground and then let off or back off the force and then and then a next impulse in the series or sequence of impulses. Each of these impulses inherently create a counter impulse back through the active isolation system 60 where some of the impulsive forces are absorbed by the pneumatic bag shack absorbers 61 and spring and hydraulic shock absorbers 62. However, the magnitude of the impulses may be anticipated by electric circuitry that is operating the acoustic energy delivery system 30 and actively counteract the impulse or contain a significant portion of the impulse within the active isolation system 60 that includes both active and reactive elements.

The alternative vibrator actuator source 10 invention is the substitution of electric power for hydraulic power in a vibrator source. In a preferred embodiment the alternative vibrator actuator source 10 is comprised of the following main components: (1) a vehicle component comprising an articulate vehicle chassis 12 with drivers' cab 18 capable of supporting the equipment and sustaining the rigors of a vibrator source; (2) a mechanical generator system that is made up of a diesel engine 21-electric generator 23 package, an electric power accumulator 24, power conditioner, power distribution center, and all necessary cables and switches; (3) an electronic control system comprised of an active isolation controller system and a displacement controller system; and (4) an electromechanical system comprised of the active isolation apparatus and the displacement apparatus.

The vehicle component is similar to the standard "buggy" type vibrator vehicles used for many all-terrain 60,000 lb industry vibrator source trucks. The chassis 12 has four large tires 15 with propulsion provided by electric motors. The chassis may be articulated at a point behind the cab 18 to provide the steering at the articulation point with force provided by linear electric motors or other electric power systems. The variation is that the industry standard trucks use hydraulics to steer and propel the truck. The vehicle component of the alternative vibrator actuator source 10 replaces hydraulics with electrical devices doing similar functions. The wheels are propelled by electric motors and the force to steer at the articulation point is provided by linear motors instead of the conventional hydraulics.

The mechanical generator system is similar to that used in many hybrid vehicles where a motor, generator, and battery pack are used to power the vehicle but on a larger scale. The mechanical generator system is comprised of an industry standard diesel engine-electric generator package that is capable of producing at minimum 800 kilowatts of electric power. The engine-generator package typically comes mounted on a steel beam base and will be installed as a kit that can be easily installed, removed and replaced as needed. Typical engine-generator packages of this kilowatt size have a weight of approximately 20,000 lb. The engine-generator package of the present invention would replace a conventional engine-hydraulic pump utilized in standard vibrators.

In order to smooth out the electrical power load an electric power accumulator is utilized that is comprised of a bank of batteries with the appropriate charging and control circuits. The electric power accumulator is similar to the concept used in hybrid vehicles and is well understood. The electric power accumulator replaces the oil accumulator in a standard hydraulic vibrator unit. A power conditioner system is utilized to assure proper voltages are provided and to limit current draw. The power conditioner replaces the multiple main valve systems found in standard hydraulic vibrator units. The power distribution center allows for the distribution of power to each of the components on the alternative vibrator actuator source 10 including the multiple linear motors 35 contained in the acoustic energy delivery system 30. The power distribution system replaces the multiple hoses and associated local valves that deliver the proper hydraulic fluid volumes and pressures to hydraulic driven devices.

The electronic control system's active displacement controller controls the actual functions of the acoustic energy delivery system 30 including the multiple linear motors 35. The electric displacement controller system allows for the replacement of the hydraulic driven reaction mass and associated base plate with the acoustic energy delivery system 30 including the multiple linear motors 35. The electronic control system's active isolation controller system controls the hold down weight applied to the acoustic energy delivery system 30 in a manner to reduce vibrations in the alternative vibrator actuator source 10. The electronic control system allows for the replacement hydraulic base plate isolation systems of standard hydraulic vibrator with an electric active base plate isolation system.

The electromechanical system's active isolation apparatus replaces the hydraulic isolation system of the standard hydraulic vibrator. The active isolation apparatus is comprised of linear motors and air bags capable of altering the hold down weight applied to the acoustic energy delivery system 30 in a manner to reduce vibration in the alternative vibrator actuator source 10.

The electromechanical system's displacement apparatus contains the acoustic energy delivery system 30 including the multiple linear motors 35. It is the component that actually imparts force on to the earth to create a deformation. The acoustic energy delivery system 30 replaces the reaction mass and associated base plate on a standard hydraulic vibrator.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A vibratory seismic source for delivering acoustic energy into the ground for seismic prospecting, the source comprising:
  a) a chassis;
  b) a generator for creating electric power mounted to the chassis;
  c) about 100 to 5,000 linear motors arranged in a grid and carried by a frame wherein each linear motor includes a rod that is arranged to move generally vertically to contact the ground with a lower end of the rod;
  d) a control system for directing electricity from the generator and concurrently from the electric power accumulator to electrically power movement and for controlling movement of the rods such that the rods vibrate the ground and deliver acoustic energy into the ground;
  e) a plurality of wheels on which to convey the source from location to location;
  f) an active isolation system arranged between the grid of linear motors and the chassis for absorbing at least a portion of the acoustic energy that is created by the linear motors and preventing the acoustic energy from conveying excessive vibration to the chassis and other portions of the seismic source; and
  g) at least one electrically powered motor to raise and lower the wheels for transiting around the survey area and adjust for delivering acoustic energy into the ground.

2. The vibratory seismic source according to claim 1, wherein the linear motors are carried by a frame, and the source includes an electric powered system to raise and lower the frame to the ground so that the rods may be operated into contact with the ground and raised up and clear of the ground when the source is moved from location to location.

3. The vibratory seismic source according to claim 1, further including a diesel engine to drive the generator.

4. The vibratory seismic source according to claim 1, wherein the mobile seismic source includes at least three wheels and each wheel includes a screw rod and screw drive assembly to individually raise and lower each of the three wheels on the mobile seismic source.

5. The vibratory seismic source according to claim 4, wherein the screw rod and screw drive assembly for each wheel further includes a load sensor to sense the weight on each wheel so that the effective weight on the ground through the lower ends of the rods may be monitored, adjusted or maintained while acoustic energy is delivered into the earth.

6. The vibratory seismic source according to claim 1, further including a plurality of wheels on which the seismic source may transit from location to location and at least one electric motor to drive at least one wheel to power the seismic source to move from location to location.

7. The vibratory seismic source according to claim 1, wherein the actively isolation system includes active shock absorber elements that are powered and controlled to actively counteract the propagation of the acoustic energy back to the remainder of the seismic source.

8. The vibratory seismic source according to claim 7, wherein the active isolation system further include reactive shock absorbers.

9. The vibratory seismic source according to claim 8, wherein the reactive shock absorbers include pneumatic bladder elements.

10. The vibratory seismic source according to claim 8, wherein the reactive shock absorbers include hydraulic shock absorbers.

11. The vibratory seismic source according to claim 8, wherein the reactive shock absorbers include at least one spring.

12. A process for delivering acoustic energy into the earth for seismic prospecting, the process comprising:
   a) creating electric power on a mobile seismic source;
   b) periodically storing excess created electric power in an electric power accumulator on the mobile seismic source;
   c) using electric power on the mobile seismic to raise and lower wheels on the mobile seismic source and thereby raise and lower the seismic source with respect to the ground;
   d) using the electric power to move each rod of about 100 to 5,000 linear electric motors generally vertically to contact the ground with the lower end of each rod at the selected location, wherein the linear electric motors are carried by a frame; and
   e) controlling movement of the rods such that the rods vibrate the ground and deliver acoustic energy into the earth;
   f) utilizing electric power directly from both the generator and the accumulator concurrently to power the linear electric motors and in step e; and
   g) actively isolating the acoustic energy that might propagate back through the mobile seismic source with active isolation elements arranged between the plurality of linear electric motors and the remainder of the mobile seismic source.

13. The process for delivering acoustic energy into the earth according to claim 12, further including the step of lowering each of the rods to the ground and maintaining the lower ends of the rods in continuous contact with the ground as the acoustic energy is delivered into the earth.

14. The process for delivering acoustic energy into the earth according to claim 12, wherein the rods are successively thrust against the ground and recoiled away from the ground without losing contact with the ground to deliver a series of impulses into the earth such that the timing for the impact, recoiling and successive impact progresses through a frequency spectrum to include a range of frequencies for acquiring reflections from the earth at geophones arrayed across a survey area.

15. The process for delivering acoustic energy into the earth according to claim 12, wherein the step of raising a lowering the wheels is performed to maintain a consistent weight through the lower ends of the rods and onto the ground while delivering acoustic energy into the earth.

16. The process for delivering acoustic energy into the earth according to claim 12, wherein the step of raising a lowering the wheels is performed to maintain the mobile seismic source relatively level while delivering acoustic energy into the earth.

17. The process for delivering acoustic energy into the earth according to claim 12, wherein the step of raising a lowering the wheels is performed to lower the mobile seismic source so that the rods are in close proximity to the ground prior to lowering the rods to the ground.

18. The process for delivering acoustic energy into the earth according to claim 12, further including a step of using electric power on the mobile seismic source to move the seismic source to a selected location and after the acoustic energy has been delivered into the earth at that selected location, using electric power on the mobile seismic source to move the seismic source to another selected location.

19. The process for delivering acoustic energy into the earth according to claim 10, wherein the step of actively isolating the acoustic energy comprises controlling movement of active shock absorber elements to actively counteract the propagation of the acoustic energy back to the remainder of the seismic source.

20. The process for delivering acoustic energy into the earth according to claim 18, wherein the active isolation system further include reactive shock absorbers.

21. The process for delivering acoustic energy into the earth according to claim 19, wherein the reactive shock absorbers include pneumatic bladder elements.

22. The process for delivering acoustic energy into the earth according to claim 19, wherein the reactive shock absorbers include hydraulic shock absorbers.

23. The process for delivering acoustic energy into the earth according to claim 19, wherein the reactive shock absorbers include at least one spring.

* * * * *